(12) United States Patent
Bender et al.

(10) Patent No.: US 10,049,121 B2
(45) Date of Patent: *Aug. 14, 2018

(54) CLONE FILE BACKUP AND RESTORE

(71) Applicant: International Business Machines Corporation, Armonk, NY (US)

(72) Inventors: Stefan Bender, Woerrstadt (DE); Nils Haustein, Soergenloch (DE); Dominic Mueller-Wicke, Weilburg (DE); Wayne A. Sawdon, San Jose, CA (US); James P. Smith, Redwood City, CA (US)

(73) Assignee: International Business Machines Corporation, Armonk, NY (US)

( * ) Notice: Subject to any disclaimer, the term of this patent is extended or adjusted under 35 U.S.C. 154(b) by 392 days.

This patent is subject to a terminal disclaimer.

(21) Appl. No.: 14/672,936

(22) Filed: Mar. 30, 2015

(65) Prior Publication Data

US 2016/0292047 A1    Oct. 6, 2016

(51) Int. Cl.
*G06F 17/30*    (2006.01)
*G06F 11/14*    (2006.01)

(52) U.S. Cl.
CPC .... *G06F 17/30221* (2013.01); *G06F 11/1435* (2013.01); *G06F 11/1453* (2013.01); *G06F 11/1458* (2013.01); *G06F 2201/84* (2013.01)

(58) Field of Classification Search
CPC ........... G06F 17/30221; G06F 11/1435; G06F 11/1453; G06F 11/1458
See application file for complete search history.

(56) References Cited

U.S. PATENT DOCUMENTS 7,694,103 B1 * 4/2010 Kushwah ............ G06F 11/1469
                                                  711/171
7,702,867 B2    4/2010 Coombs et al.
(Continued)

FOREIGN PATENT DOCUMENTS

WO    2012075475 A2    6/2012
WO    2014130035 A1    8/2014

OTHER PUBLICATIONS

Khandelwal et al., "Using Incremental Backups for Cloned Virtual Machines (VMs) instead of Full Backups", ip.com Disclosure No. IPCOM000226888D, Publication Date: Apr. 23, 2013, 3 pages, © & ™ 2013 Symantec Corporation, <https://priorart.ip.com/IPCOM/000226888>.

(Continued)

*Primary Examiner* — Cam-Y Truong
(74) *Attorney, Agent, or Firm* — Issac J. Gooshaw

(57) ABSTRACT

In an approach to backup and restore one or more clone file trees, one or more processors generate a clone management table. One or more processors record a clone management information in the clone management table about each clone file. To backup a clone file, one or more processors update the clone management information, and store one or more data blocks that are in the clone file trees. To restore a clone file, one or more processors analyze a clone management information and restore one or more data blocks in the clone file. To restore a clone file parent, one or more processors analyze a clone management information and restore one or more data blocks in the clone file parent. To restore a clone file tree, one or more processors analyze a clone management information and restore one or more data blocks in the clone file tree.

11 Claims, 9 Drawing Sheets

(56) References Cited

U.S. PATENT DOCUMENTS

| | | | |
|---|---|---|---|
| 7,873,601 B1 | 1/2011 | Kushwah | |
| 7,913,044 B1 | 3/2011 | Desai et al. | |
| 8,719,286 B1 | 5/2014 | Xing et al. | |
| 8,738,870 B1 | 5/2014 | Balasubramanian et al. | |
| 8,788,769 B2 | 7/2014 | Abercrombie et al. | |
| 2007/0136391 A1* | 6/2007 | Anzai | G06F 17/30197 |
| 2010/0070764 A1* | 3/2010 | Ishii | G06F 11/1453 |
| | | | 713/168 |
| 2011/0072224 A1* | 3/2011 | Popovski | G06F 3/0611 |
| | | | 711/162 |
| 2011/0078117 A1* | 3/2011 | Ishii | G06F 11/1451 |
| | | | 707/640 |
| 2011/0225209 A1 | 9/2011 | Volvovski et al. | |
| 2012/0151250 A1* | 6/2012 | Saika | G06F 11/1417 |
| | | | 714/4.11 |
| 2013/0311429 A1* | 11/2013 | Agetsuma | G06F 11/1451 |
| | | | 707/640 |
| 2014/0019414 A1* | 1/2014 | Abraham | G06F 11/1469 |
| | | | 707/640 |
| 2014/0074790 A1* | 3/2014 | Berman | G06F 17/3007 |
| | | | 707/649 |
| 2016/0292041 A1 | 10/2016 | Bender et al. | |

OTHER PUBLICATIONS

Tan et al., "SAFE: A Source Deduplication Framework for Efficient Cloud Backup Services", J Sign Process Syst (2013) 72:209-228, DOI 10.1007/s11265-013-0775-x, Published online: Jun. 21, 2013, © Springer Science+Business Media New York 2013.

U.S. Appl. No. 14/859,673, Entitled "Clone File Backup and Restore", filed Sep. 21, 2015.

Appendix P, "List of IBM Patents or Patent Applications Treated As Related", Dated Sep. 11, 2017, 2 pages.

* cited by examiner

| FILE NAME | FILE INODE NUMBER | FILE SIZE | FILE INODE DATA | BLOCK OFFSET | BLOCK LENGTH | PARENT FILE INODE NUMBER | DEPTH LEVEL | CHILD COUNT | LAST UPDATE | VALID |
|---|---|---|---|---|---|---|---|---|---|---|
| FILE A | 0001 | 10000 | BLOB | 0 | 128 | 0003 | 1 | 1 | 20 | U |
| FILE X | 0006 | 20000 | BLOB | 17 | 18 | 0001 | 2 | 0 | 20 | U |
| FILE X | 0006 | | | 64 | 92 | 0001 | 2 | -1 | 20 | U |
| FILE D | 0003 | 3000 | BLOB | 0 | 1024 | | 0 | 2 | 20 | U |
| FILE E | 0004 | 6000 | BLOB | 32 | 64 | 0005 | 2 | 0 | 20 | U |
| FILE Z | 0007 | 500 | BLOB | 0 | 256 | | 0 | 0 | 20 | U |
| FILE G | 0005 | 1000 | BLOB | 0 | 512 | 0003 | 1 | 1 | 20 | U |

| FILE NAME | FILE INODE NUMBER | FILE SIZE | FILE INODE DATA | BLOCK OFFSET | BLOCK LENGTH | PARENT FILE INODE NUMBER | DEPTH LEVEL | CHILD COUNT | LAST UPDATE | VALID |
|---|---|---|---|---|---|---|---|---|---|---|
| | | | | | | | | | | |

| FILE NAME | FILE INODE NUMBER | FILE SIZE | FILE INODE DATA | BLOCK OFFSET | BLOCK LENGTH | PARENT FILE INODE NUMBER | DEPTH LEVEL | CHILD COUNT | LAST UPDATE | VALID |
|---|---|---|---|---|---|---|---|---|---|---|
| FILE A | 0001 | 10000 | BLOB | 0 | 10000 | | 0 | 1 | 99 | U |
| FILE B | 0002 | 5000 | BLOB | 0 | 5000 | 0001 | 1 | 0 | 99 | U |
| FILE C | 0003 | 10000 | BLOB | 0 | 4567 | | 0 | 0 | 99 | U |

CLONE FILE BACKUP AND RESTORE

BACKGROUND OF THE INVENTION

The present invention relates generally to the field of file systems, and more specifically to file systems with clone files.

The significant growth of the amount of data to be stored in quickly accessible form is a challenge to system designers that are concerned with storage efficiency and data integrity protection. For example, analytics, stream computing (the analysis of high bandwidth flows of data from real-time sources), and data warehousing require fast access to large quantities of data. In large storage systems, data must be available for immediate and recurring processing, be stored efficiently, be protected against hardware and software failures, and be scalable in terms of its size and the amount of compute power that may be applied to it. Efficient storage techniques often enable storage systems to be faster which can provide users with quick access.

To utilize storage efficiently, a technique called file cloning has been developed to reduce the storage consumed by multiple versions (clones) of a file that is opened and edited by multiple users. File cloning enables storage space to be conserved by storing an original file in a read-only mode and allocating additional storage space for only the data written into the file by users. The additional space is only large enough to contain the new data that has been written into the clone file by a user. The additional space is read and write enabled, read from so that newly written data, which is not in the original file, may be accessed. Data that has not been changed is read from the original file. Such an arrangement is called a clone file. For example, this enables two copies of a file (two clones of the file) that are altered by two users, to consume only a fraction of the space that two complete copies of the original file, one for each user, would have otherwise consumed. File cloning is reduces the overall space needs for copies of files where the file copies (called child or clone files) have a significant amount of unchanged data compared to the original files (parent files).

For example, clone files can be used to provision virtual machines by creating a virtual disk for each machine by cloning a common base image file, often referred to as a "gold image". A related usage is to clone the virtual disk image of an individual machine as part of taking a snapshot of the machine state. Cloning a file is similar to creating a copy of a file, but the creation process is faster and more space efficient because no additional disk space is consumed until the clone or the original file is modified. Multiple clones of the same file can be created with no additional storage space allocated and clones of clones can be created. While the cloning of files decreases storage space for active files on a server, current techniques to backup clone files consume the storage space of a non-cloned file for each clone file that is backed up, and upon restore, restores original clone files as a non-cloned files.

Unix-style file systems record information in data structures called inodes that is used to locate and manage files. In a Unix-style file system, an index node, informally referred to as an inode, is a data structure used to represent a file system object, which can be one of several things including a file or a directory. Inodes store the attributes and disk block location(s) of the file system object's data. File system object attributes may include manipulation metadata (e.g., change, access, and modify times), as well as owner and permission data (e.g., group-id, user-id, and permissions). Inodes are also instrumental in the creation and management of clone files on a Unix-style file system that supports clone files. Metadata in an inode of a clone file specifies its parent file.

SUMMARY

Aspects of an embodiment of the present invention disclose a method, program product, and system for backing up and restoring one or more clone file trees. The method includes generating, by one or more processors, a clone management table. The method further includes recording, by one or more processors, in the clone management table, a clone management information about each clone file in one or more clone file trees in a file system. The method further includes, responsive to receiving a backup request, updating, by one or more processors, the clone management information, and storing one or more data blocks that are in the one or more clone file trees. The method further includes, responsive to receiving a request to restore a clone file, analyzing, by one or more processors, a clone management information about the clone file, and restoring one or more data blocks in the clone file to the file system. The method further includes, responsive to receiving a request to restore a clone file parent, analyzing, by one or more processors, a clone management information about the clone file parent, and restoring one or more data blocks in the clone file parent to the file system. The method further includes, responsive to receiving a request to restore a clone file tree, analyzing, by one or more processors, a clone management information about the clone file tree, and restoring one or more data blocks in the clone file tree to the file system.

DETAILED DESCRIPTION

Figure 1:
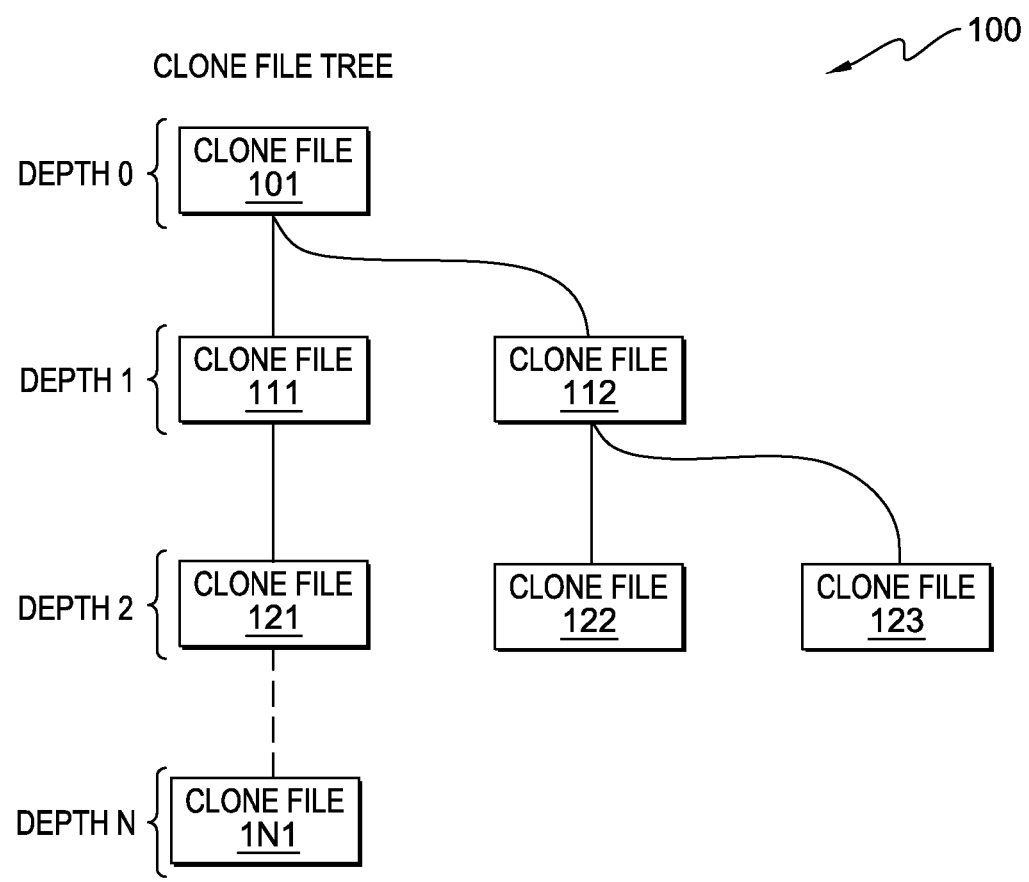
FIG. 1 depicts a block diagram of a clone file tree.

Detailed embodiments of the present invention are disclosed herein with reference to the accompanying drawings. It is to be understood that the disclosed embodiments are merely illustrative of potential embodiments of the present invention and may take various forms. In addition, each of the examples given in connection with the various embodiments is intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

A clone file is a writable point-in-time snapshot of an individual file. Clone files can be used to provision virtual machines by creating a virtual disk for each machine by cloning a common base image, often referred to as a "gold image". A related usage is to clone the virtual disk image of an individual machine as part of taking a snapshot of the machine state. Cloning a file is similar to creating a copy of a file, but the creation process is faster and more space efficient because no additional disk space is consumed until the clone or the original file is modified. Multiple clones of the same file can be created with no additional space overhead. Clones of clones can be created.

File cloning is a concept to reduce the overall space needs for copies of files where the file copies (child or clone) have a significant amount of unchanged data compared to the original files (parent). In one embodiment, a file system is included that implements the concept of clone files and uses the terminology parent file, parent, or clone parent for the original file and clone file or clone for a clone of a parent. A clone parent is a read-only file that contains all data blocks that were originally in the file when the clone was created. When a clone file is created, the data in its parent becomes read-only. A clone (i.e., a child of a parent) is a file that contains only the data blocks that have been written or have been added relative to the parent. These data blocks in the clone file are data blocks that have been modified (added or changed) relative to the parent. A data block that is deleted from the clone file or its parent has its representation in the clone file deleted. A user of a clone child accesses all unmodified data from the parent. The clone child is not useful without a parent because it does not contain all the data in a file and therefore a valid clone child does not exist without a parent. In a file system that implements clones, if a user reads a data block (from a cloned file) that has not been modified since the creation of the clone, the file system automatically reads the data block from the parent and returns it to the user, otherwise the file system reads the block from the clone.

A clone file can be cloned. For example, a clone file B that has a parent A can be cloned. If an additional clone file, clone file C for example, is created from clone file B, the data in clone file B is becomes read-only and is immutable. At this point, clone file B contains data that was augmented or altered in parent A, subsequent to clone file B's creation. When clone file C is created, the data in both parent A and clone file B is immutable, i.e., the data in parent A and clone file B remains unchanged for the life of the files. When clone file C is created, clone file B becomes the parent of clone file C. All subsequent writes and augmentations to data in parent A and in clone file B are stored in clone file C. If a user of clone file C reads data from clone file C, the actual data may be read from clone file C, or its parent, clone file B, or from clone file B's parent, parent A, i.e., the data is read from the clone file that contains the most recent copy of the data.

A parent can have multiple children. That is, a file that is cloned and has become a parent, may be cloned again. The data in a parent file becomes read-only when the file is cloned for the first time. A parent with multiple children, which themselves may have been cloned, can be envisioned as the single root of a tree of clone files. Such a tree of clone files is called a clone file tree.

FIG. 1 depicts clone file tree 100. Clone file 101 is the original file and is at a tree depth of 0. Clone file 111 is a clone of clone file 101 and when clone file 111 is created, clone file 101 becomes the parent of clone file 111, and the data in clone file 101 becomes read-only and immutable. Clone file 111 is at a clone tree depth of 1. If clone file 121 is created, which is a clone of clone file 111, clone file 111 becomes the parent of clone file 121, and the data in clone file 111 becomes read-only and is immutable. Clone file 121 is at a tree depth of 2. Clone file 111 contains data that has been written or augmented since clone file 111 was created and clone file 121 contains data that has been written or augmented since clone file 121 was created. Therefore, if a user reads data from clone file 121, the data is read, unknown to the user, from the clone file that contains the most recent copy of the data, clone file 101, clone file 111, or clone file 121. Clone file 1N1 is at tree depth N, and is at the end of a chain of clone files and illustrates that a chain of clone files can be of arbitrary length. If a user reads data from clone file 1N1, the data is read, unknown to the user, from a clone file in the chain that contains the most recent copy of the data, beginning with clone file 101.

Clone file 101 has multiple children. As shown in FIG. 1, clone tree 100 clone file 101 has been cloned a second time, making clone file 101 the parent of a second clone file, clone file 112. In clone tree 100, clone file 112 has been cloned twice, once becoming the parent of clone file 122 and a second time, becoming the parent of clone file 123.

Embodiments of the present invention recognize that significant storage efficiencies accrue if clone files in a clone file tree such as clone file tree 100 are backed up in a manner that does not replicate data on a backup server. Embodiments of the present invention also recognize that significant storage efficiencies accrue if all or part of a clone file tree can be restored its original clone file tree form on a file system after being backed up, thus preserving the storage space efficiencies inherent in the clone file tree. Embodiments of the present invention maintain information in a clone management table that enables the backup and restoration of all or part of a clone file tree in a manner that precludes data redundancies and restores a clone file tree to the form it had when backed up.

In one embodiment, a file system is included that stores information about a file in the file system in a data structure called an inode. For example, Unix-style file systems record information in inodes that is used to locate and manage files. In a Unix-style file system, an index node, informally referred to as an inode, is a data structure used to represent a file system object, which can be one of several things including a file or a directory. Inodes store the attributes and disk block location(s) of the file system object's data. File system object attributes may include manipulation metadata (e.g., change, access, and modify times), as well as owner and permission data (e.g., group-id, user-id, and permissions). In some scenarios and embodiments, information about one or more inodes is included in the information in the clone management table that is used to manage clone files and the backup and restoration of clone files and clone file trees.

In some embodiments and scenarios, the automatic determination of the location of a data block that is read by a user is enabled by metadata stored in an inode of the clone child and in an inode of the clone parent. The inode metadata in the child specifies the parent file. Other data in the child specifies the locations of data blocks that are in the child (modified data) and in the parent (unmodified data). In an embodiment, the inode metadata stored in the parent includes a count of the parent's clone children.

Figure 2:
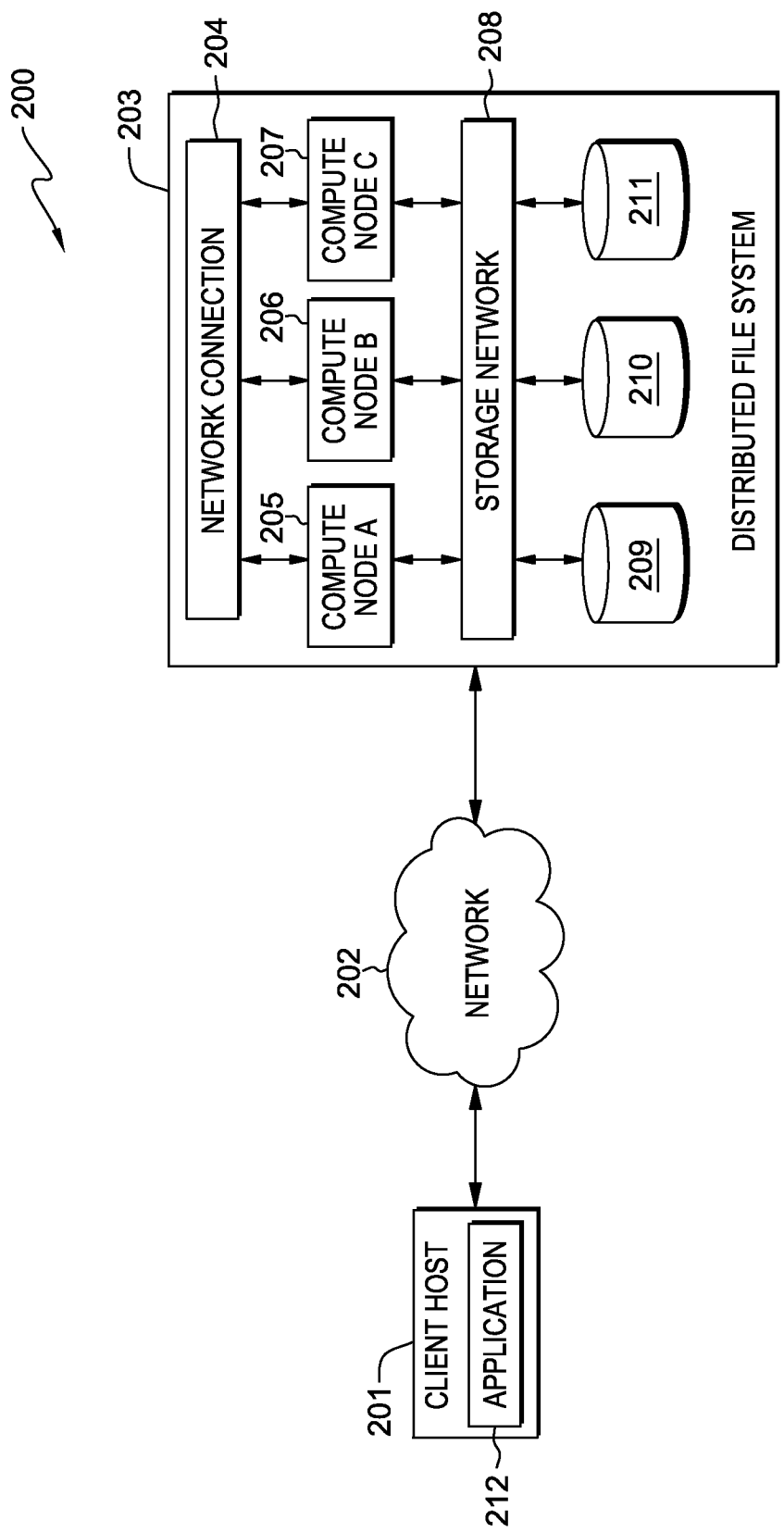
FIG. 2 depicts a block diagram of a portion of a computing complex, in accordance with an embodiment of the present invention.

FIG. 2 depicts distributed computing system 200. In some scenarios and embodiments, computing system 200 is comprised of client host 201 connected to distributed file system 203 via network 202. Client host 201 executes application 212 that accesses files on distributed file system 203. Distributed file system 203 is comprised of network connection 204, compute node A 205, compute node B 206, and compute node C 207, storage network 208, and storage units 209, 210, and 211. Storage network 208 connects compute node A 205, compute node B 206, and compute node C 207 to storage units 209, 210, and 211 and enables any compute node to access any storage unit. Distributed file system 203 is a file server for client host 201 and provides backup and restore services for data stored on distributed file system 203. Clone files and clone file trees can be created, stored, backed up, and restored on distributed file system 203. Those skilled in the art understand that computing system 200 can have various numbers of compute nodes and storage units and that the number of client hosts and applications executing on a client host can vary.

Compute node A 205, compute node B 206, and compute node C 207 are computers that host software that manages distributed file system 203 and access data on storage units 209, 210, and 211 in response to requests from application 212 executing in client host 201. Storage units 209, 210, and 211 are also accessed by compute node A 205, compute node B 206, and compute node C 207 to backup and restore data that is managed by distributed file system 203.

Figure 3:
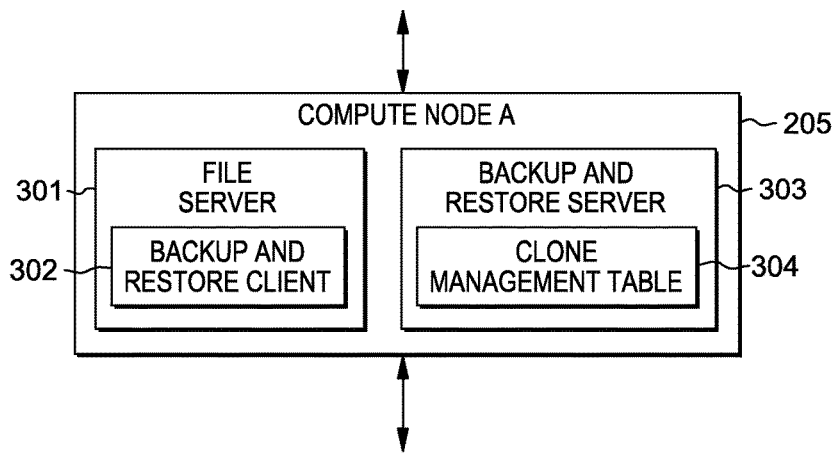
FIG. 3 depicts a detail of compute node A depicted in FIG. 2, in accordance with an embodiment of the present invention.

FIG. 3 depicts compute node A in more detail. In some scenarios and embodiments, compute node A is comprised of file server 301 and backup and restore server 303. In alternative embodiments backup and restore server 303 resides on one or more compute nodes in distributed file system 203. In an embodiment, file server 301 includes backup and restore client 302. Backup and restore server 303 includes clone management table 304. File server 301 responds to data requests from application 212 by accessing data in storage units 209, 210, and 211. Backup and restore client 302 backs up and restores files in storage units 209, 210, and 211 in response to a schedule, a system failure, or a maintenance request that can be generated automatically and manually. In and embodiment, clone management table 304 includes clone management information on the clone files and clone file trees that are stored in distributed file system 203.

Figure 4:
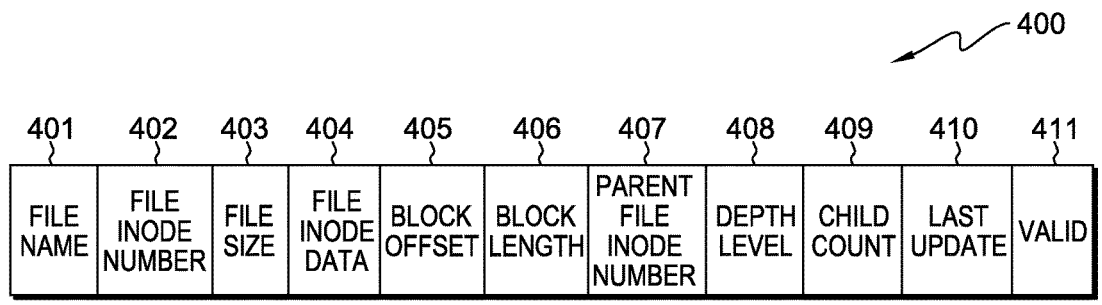
FIG. 4 depicts a detail of the clone management table depicted in FIG. 3, in accordance with an embodiment of the present invention.

FIG. 4 depicts a detail of information 400 in an entry in clone management table 304 that is stored on backup and restore server 303. In some scenarios and embodiments, clone management table 304 contains one or more entries per parent file or clone file. A parent file or clone file has an entry in clone management table 304 for each its blocks of data in distributed file system 203. File name 401 is the unique identifier of the file system object (parent file or clone file). File name 401 is the full qualifying path of the file. File inode number 402 is the inode number of the file. File size 403 is the logical size of the file in file system blocks, i.e., the number of blocks that the parent at the root of a clone file tree (root parent file) uses in the file system. File inode data 404 is file metadata that is included in the inode and enables the file to be managed and restored. In an embodiment, file inode data 404 includes permissions, timestamps, access control list (ACL), and extended attributes (EA). File inode data 404 is sometimes called a binary large object block (BLOB). Block offset 405 is the offset of a unique data block in the clone file referenced by file name 401 to a predetermined location. Block length 406 is the length of a unique data block in the clone file. Parent file inode number 407 is the inode number of the parent file to file name 401. Depth level 408 is the level of the file in the clone file tree where depth 0 is assigned to the root parent file. Child count 409 is the number of clone files (children) for which the file is a parent and is used among other things to locate the root of a clone file tree. In an embodiment, a child count of 0 indicates that the file has no children and a file count of −1 indicates that this entry provides information on an additional data block in the file and that another entry for the file contains the child count for the file. Last update 410 is the time stamp of the last update to this entry during a backup operation to backup the file. Valid 411 is a value that indicates if the entry is valid. The validity of an entry is evaluated by backup and restore client 302 when backup and restore client 302 executes a validity check of clone management table 304. In an embodiment, valid 411 is "U" if the file is unchecked (e.g., a new or updated file), valid 411 is "V" if the file has been checked and has a valid parent clone, and valid 411 is "I" if the file has been checked but the clone file tree that the file is in is missing a clone file at this point in the validity check.

Figures 5, 6:
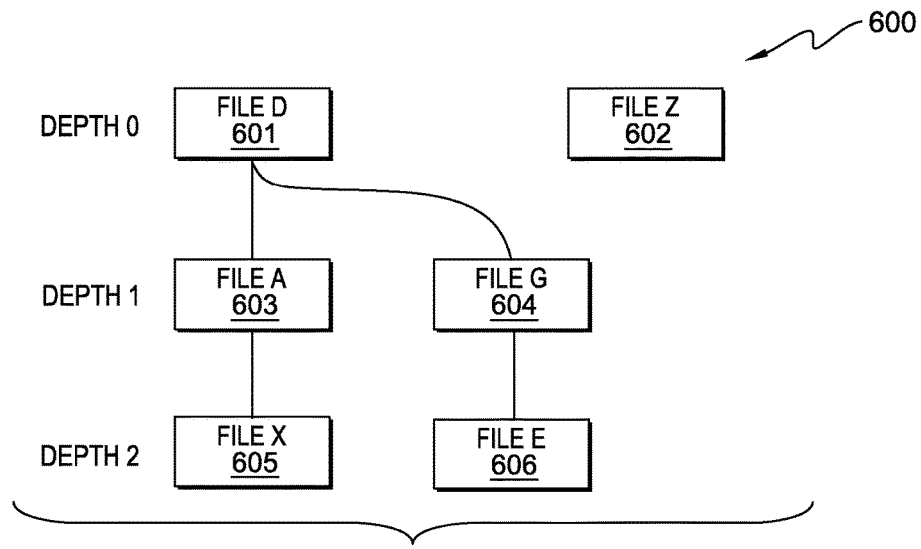
FIG. 5 depicts a detail of an exemplary contents of the clone management table depicted in FIG. 3, in accordance with an embodiment of the present invention.
FIG. 6 depicts a block diagram of an exemplary clone file tree, in accordance with an embodiment of the present invention.

FIG. 5 depicts data 500 in clone management table 304, which is an example of a data set populated in clone management table 304 that, in an embodiment, describes clone file tree 600 shown in FIG. 6. The table contains two parent clone files at clone tree depth 0. Any clone file at clone tree depth 0 is a parent file by definition. Clone file D 601 and clone file Z 602 are at depth 0. Clone file Z 602 has no children and clone file D 601 has 2 children. Since clone file Z 602 is at depth 0 but has no children, clone file Z 602 is a root parent with no children. Examination of clone files in clone management table 304 at depth 1 in clone file tree 600 reveals two clone files at level 1, clone file A 603, and clone file G 604, both clone files having "0003" as their parent file inode number. The file inode number of clone file D 601 is "0003", therefore clone file D 601 is the parent of clone file A 603 and clone file G 604. Clone file A 603 has one child and clone file G 604 has one child. The file inode number of clone file A 603 is "0001", therefore a child of clone file A 603 has a parent file inode number of "0001". The parent file inode number of clone file X 605 is "0001" therefore clone file X 605 is the child of clone file A 603, and clone file A 603 is the parent of clone file X 605. Clone file X 605 has two entries in clone management table 304, one entry has a child count of 0 therefore clone file X 605 has no children, and one entry has a child count of −1. A child count of −1 indicates that this clone file X 605 entry describes the location of data blocks in clone file X 605 that are not contiguous with data blocks in clone file X 605 that are described in a different entry for clone file X 605.

Clone file G 604 has a file inode number of "0005" and has a child count of 1, therefore the child of clone file G 604 will have a parent inode number of "0005". Clone file E 606 has a parent inode number of "0005" and is therefore the child of clone file G 604. The entry for clone file E 606 in clone management table 304 indicates a child count of 0, therefore clone file E 606 has no children.

If it is necessary to backup some clone files on distributed file system 203, backup and restore client 302 requests that backup and restore server 303 backup the clone files. Backup and restore server 303 analyzes clone management table 304 and uses information in the table to restore the files.

Figures 7, 8, 9:
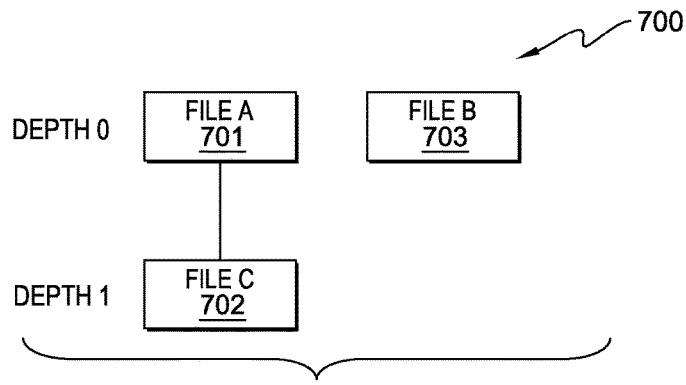
FIG. 7 depicts a block diagram of an exemplary clone file tree, in accordance with an embodiment of the present invention.
FIG. 8 depicts a detail of an exemplary contents of the clone management table depicted in FIG. 3, in accordance with an embodiment of the present invention.
FIG. 9 depicts a detail of an exemplary contents of the clone management table depicted in FIG. 3, in accordance with an embodiment of the present invention.

In an example clone file backup operation, backup and restore server 303 receives a backup request from backup and restore client 302 to backup files 700 depicted in FIG. 7. In an embodiment, backup and restore server 303 analyzes files 700 on distributed file system 203 and updates clone management table 304, which, in the example clone file backup operation, initially contains data 800 as depicted in FIG. 8. Data 800 depicts an empty clone management table 304. Backup and restore client 302 initiates the backup procedure at time 99, and traverses the file system, and finds clone file A 701, clone file C 702, and clone file B 703 in distributed file system 203. Backup and restore server 303 accesses data 800 to determine if data 800 is up to date and does not find an entry for clone file A 701, clone file C 702 and clone file B 703. Backup and restore server 303 collects the missing information on the clone files from metadata on clone file A 701, clone file C 702 and clone file B 703 in distributed file system 203 and updates data 800 with the missing information. FIG. 9 depicts data 900 in clone management table 304, which is data 800 in clone management table 304 after it has been updated with the missing information. Backup and restore server 303 backs up clone file A 701, clone file C 702 and clone file B 703 in distributed file system 203 and records a last backup time of "99" in data 900 for clone file A 701, clone file C 702 and clone file B 703.

Figure 10:
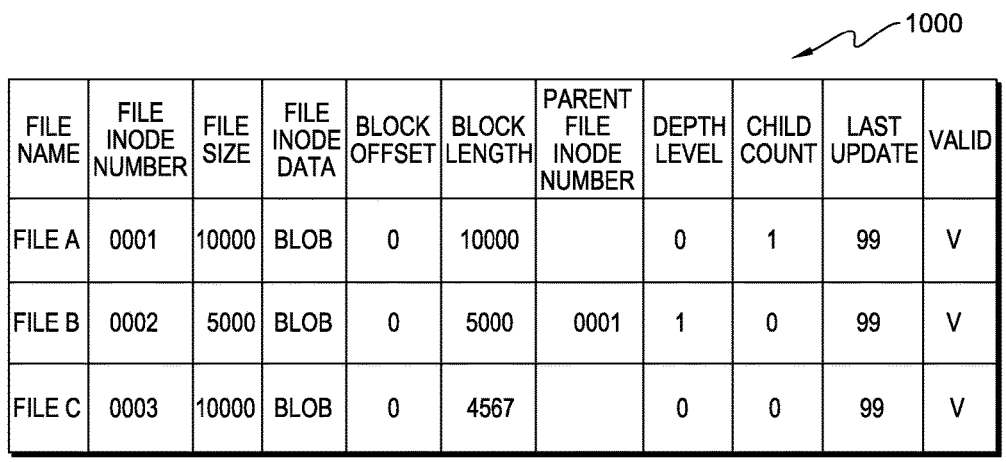
FIG. 10 depicts a detail of an exemplary contents of the clone management table depicted in FIG. 3, in accordance with an embodiment of the present invention.

FIG. 10 depicts data 1000 in clone management table 304, which is data 900 after backup and restore server 303 receives a validity check request from backup and restore client 302 and executes a validity check on data 900. In an embodiment, backup and restore server 303 traverses data 900 and searches for file entries that have no parent file information. Backup and restore server 303 finds clone file A 701 first and clone file A 701 is marked as validated by setting valid 411 to "V" in data 1000. Because the child count of clone file A 701 is 1 (indicating that it is the parent of 1 child) backup and restore server 303 searches for one or more file entries in data 900 that have the file inode number of clone file A 701 ("0001") as a parent file inode number. The entry for clone file B 703 lists "0001" as its parent file inode number, therefore clone file B 703 is the child of clone file A 701. Backup and restore server 303 determines if clone file B 703 has a child. Because child count 409 is set to 0 in the entry for clone file B 703 in data 900, valid 411 is set to "V" (i.e., validated) in data 1000 in the entry for clone file B 703. Since clone file A 701 has no unexamined children in data 900, backup and restore server 303 searches for a file in data 900 that has no parent file and finds clone file C 702. Since clone file C 702 no children, backup and restore server 303 validates the entry for clone file C 702 in data 1000 (by setting valid 411 to "V") and searches for a next file entry in data 900 that has no parent file. Since there are no unexamined files or invalid files in data 900, the validity check terminates.

In an embodiment, after backup and restore server 303 completes a validity check, it creates an invalid entry table that contains any remaining invalid or unchecked entries in data 900. The invalid entry table is used by a user to manually analyze inconsistencies among the clone files in the invalid entry table.

Figure 11:
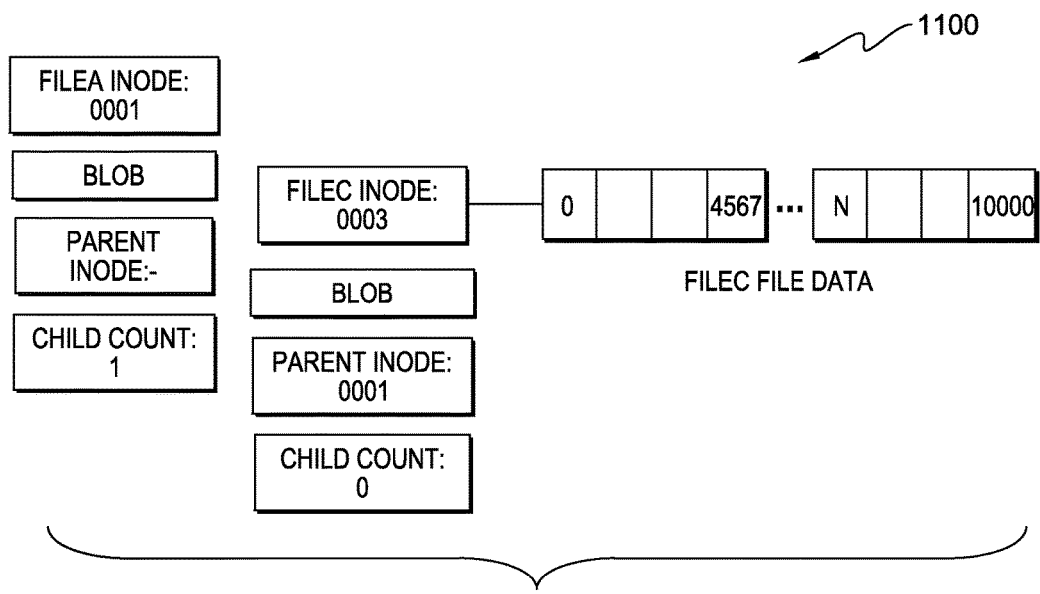
FIG. 11 depicts an exemplary representation of a clone file tree that has been restored, in accordance with an embodiment of the present invention.

Backup and restore server 303 can restore a clone file child (that has been lost or corrupted) to its clone file parent in a clone file tree by analyzing information about the clone file child in clone management table 304. For example, if backup and restore server 303 receives a request from backup and restore client 302 to restore clone file C 702 to distributed file system 203, backup and restore client 302 searches data 1000 in clone management table 304 for one or more entries for clone file C 702 and determines that clone file C 702 is a child of clone file A 701 and that clone file C 702 has no children. Backup and restore client 302 creates clone file C 702 in distributed file system 203 using information about clone file C 702 in data 1000. FIG. 11 shows representation 1100 of clone file C 702 as a child of clone file A 701 in clone file tree 700 after clone file C 702 has been restored.

Figure 12:
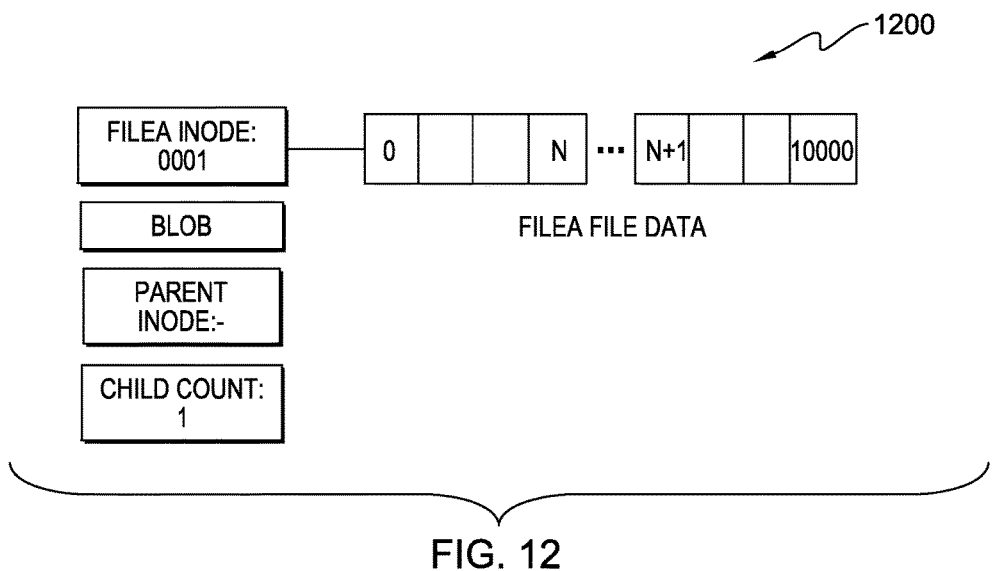
FIG. 12 depicts an exemplary representation of a clone file that has been restored, in accordance with an embodiment of the present invention.

Backup and restore server 303 can restore a clone file parent (that has been lost or corrupted) to its clone file tree by analyzing information about the clone file parent in clone management table 304. For example, if backup and restore server 303 receives a request from backup and restore client 302 to restore clone file A 701 to distributed file system 203, backup and restore client 302 searches data 1000 in clone management table 304 for one or more entries for clone file A 701 and verifies that clone file A 701 has one or more children. Backup and restore client 302 creates clone file A 701 in distributed file system 203 using information about clone file A 701 in data 1000. FIG. 12 shows representation 1200 of clone file A 701 after clone file A 701 has been restored.

Figure 13:
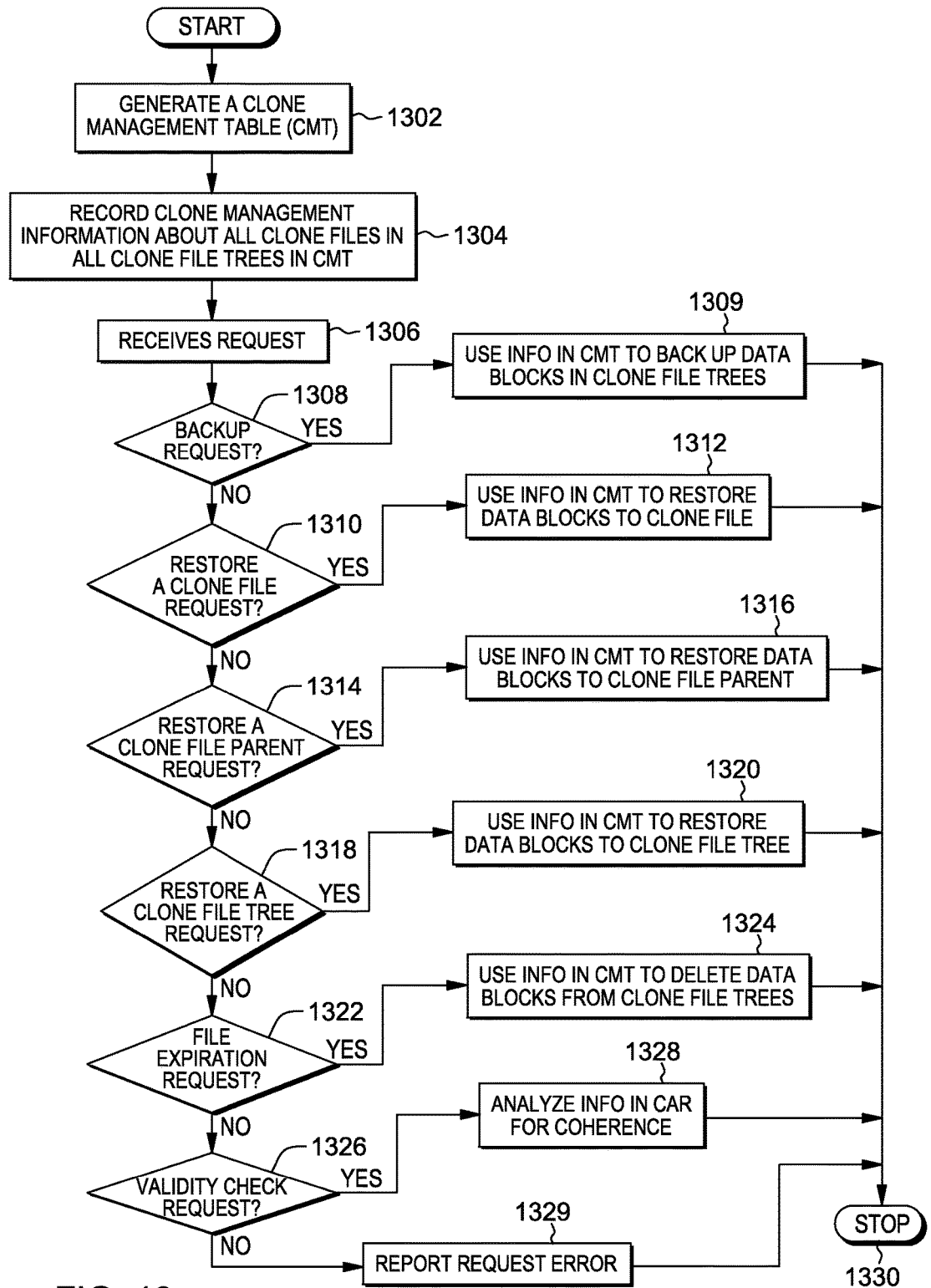
FIG. 13 depicts a flowchart illustrating the operational steps performed by a backup and restore server of FIG. 3, in accordance with an embodiment of the present invention.

FIG. 13 depicts a flowchart illustrating the operational steps performed by backup and restore server 303 of FIG. 3, in accordance with an embodiment of the present invention. In the embodiment of FIG. 13, the steps of the flowchart are further embodied by software operating on backup and restore server 303. As such, this software, when executed, causes backup and restore server 303 to carry out the processes described in the steps of the flowchart. In other embodiments, at least some of the processes described are embodied by hardware accessible by backup and restore server 303. Such hardware is configured to carry out one or more of the processes included in the steps of the flowchart. In this embodiment, backup and restore server 303 generates clone management table (CMT) 304 (step 1302). Backup and restore server 303 records clone management information about all the clone files in all clone trees in clone management table 304 (step 1304). Backup and restore server 303 receives a request (step 1306). If the request is a backup request (decision step 1308, YES branch), backup and restore server 303 uses information in CMT 304 to backup data blocks in clone file trees (step 1309) and terminates (step 1330).

In step 1309, before performing a backup operation, backup and restore server 303 traverses the file system and collects information on the clone files that it finds. For each parent or child clone file found, backup and restore server 303 collects: parent inode number (0 if no parent exists), a list of unique block sequences with offset and length, a depth in clone tree, and a child count. For each clone file found, backup and restore server 303 compares the information that it has collected on the clone file that it has found with information in clone management table 304 and takes the following actions: If an entry in clone management table 304 for the clone file exists and all the values in the entry are equal to the values found in the file system, update the time stamp with backup start time in the clone management table 304 and do not backup the file. If no entry in clone management table 304 for the clone file exists, create an entry in clone management table 304 for each unique block sequence in the clone file and backup the clone file. Update the time stamp in the entry with the backup start time. If an entry in clone management table 304 for the clone file exists, but blocks within the block sequence have been written to, update the entry for the clone file in clone management table 304. Update the time stamp in the entry with backup start time. Backup the blocks that have been written to in the clone file. If an entry in clone management table 304 for the clone file exists, but the block sequence in the entry has been augmented with additional blocks in the file system, create and add new entries for the clone file in clone management table 304 that describe the additional blocks. Update the time stamp for the file entry with backup start time and backup the additional blocks. If an entry in clone management table 304 for the clone file exists, but the block sequence in the file system does not have all the blocks described in the entry, remove descriptions of the blocks that were not found in the file system from clone management table 304. If an entry in clone management table 304 for the clone file exists and shows no children, but one or more children were found in the file system, update the entry for the clone file clone management table 304 to the correct number of children. Update the time stamp in the clone file entry in clone management table 304 with backup start time.

If the request is not a backup request (decision step 1308, NO branch), backup and restore server 303 decides if the request is a request to restore a clone file (decision step 1310). If the request is to restore a clone file (decision step 1310, YES branch), backup and restore server 303 uses information in the CMT to restore data blocks to the clone file (step 1312) and terminates (step 1330).

If the request is not a request is to restore a clone file (decision step 1310, NO branch), backup and restore server 303 decides if the request is a request to restore a clone file parent (decision step 1314). If the request is to restore a clone file parent (decision step 1314, YES branch), backup and restore server 303 uses information in the CMT to restore data blocks to the clone file parent (step 1316) and terminates (step 1330).

If the request is not a request is to restore a clone file parent (decision step 1314, NO branch), backup and restore server 303 decides if the request is a request to restore a clone file tree (decision step 1318). If the request is to restore a clone file tree (decision step 1318, YES branch), backup and restore server 303 uses information in the CMT to restore data blocks to the clone file tree (step 1320) and terminates (step 1330).

If the request is not a request is to restore a clone file tree (decision step 1318, NO branch), backup and restore server 303 decides if the request is a file expiration request (decision step 1322). If the request is a file expiration request (decision step 1322, YES branch), backup and restore server 303 uses information in the CMT to delete data blocks from clone file trees (step 1324) and terminates (step 1330).

If the request is not a file expiration request (decision step 1322, NO branch), backup and restore server 303 decides if the request is a validity check request (decision step 1326). If the request is a validity check request (decision step 26, YES branch), backup and restore server 303 analyzes information in the CMT for coherency (step 1328) and terminates (step 1330). If the request is not validity check request (decision step 1326, NO branch), backup and restore server 303 reports a request error to backup and restore client 302 and terminates (step 1330).

Figure 14:
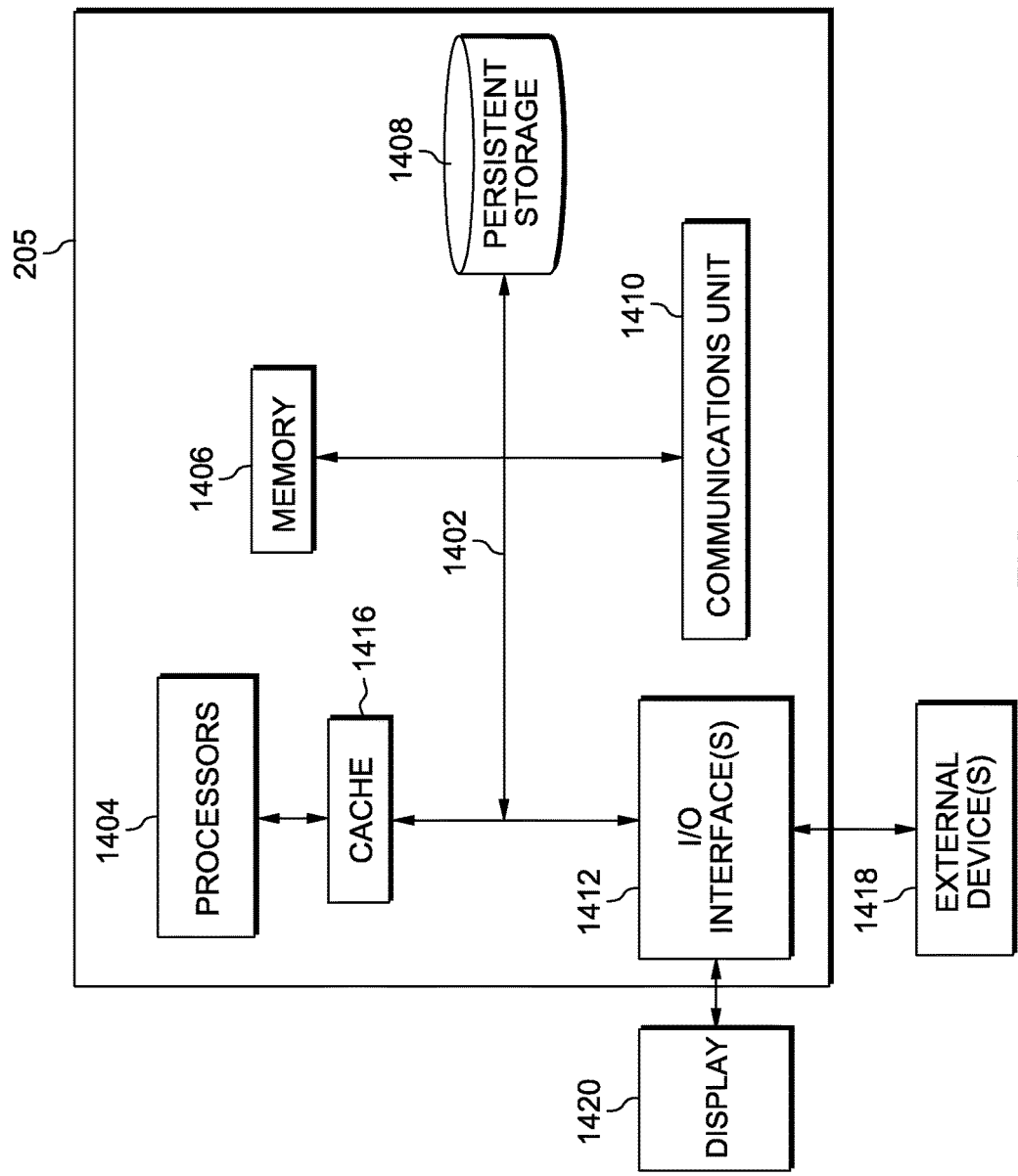
FIG. 14 depicts a block diagram of a computer system that incorporates compute node A that is depicted in FIGS. 2 and 3, in accordance with an embodiment of the present invention.

FIG. 14 depicts an exemplary embodiment of compute node A 205, which hosts file server 301 and backup and restore server 303. Compute node A 205 includes processors 1404, cache 1416, communications fabric 1402, which provides communications between cache 1416, memory 1406, persistent storage 1408, communications unit 1410, and input/output (I/O) interface(s) 1412. Communications fabric 1402 can be implemented with any architecture designed for passing data and/or control information between processors (such as microprocessors, communications and network processors, etc.), system memory, peripheral devices, and any other hardware components within a system. For example, communications fabric 1402 can be implemented with one or more buses.

Memory 1406 and persistent storage 1308 are computer readable storage media. In this embodiment, memory 1406 includes random access memory (RAM). In general, memory 1406 can include any suitable volatile or non-volatile computer readable storage media. Cache 1416 is a fast memory that enhances the performance of processors 1304 by holding recently accessed data and data near accessed data from memory 1306.

Program instructions and data used to practice embodiments of the present invention may be stored in persistent storage 1408 for execution by one or more of the respective processors 1404 via cache 1416 and one or more memories of memory 1306. In an embodiment, persistent storage 1408 includes a magnetic hard disk drive. Alternatively, or in addition to a magnetic hard disk drive, persistent storage 1308 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 1408 may also be removable. For example, a removable hard drive may be used for persistent storage 1408. Other examples include optical and magnetic disks, thumb drives, and smart cards that are inserted into a drive for transfer onto another computer readable storage medium that is also part of persistent storage 1408.

Communications unit 1410, in these examples, provides for communications with other data processing systems or devices. In these examples, communications unit 1410 includes one or more network interface cards. Communications unit 1410 may provide communications through the use of either or both physical and wireless communications links. Program instructions and data used to practice embodiments of the present invention may be downloaded to persistent storage 1408 through communications unit 1410.

I/O interface(s) 1412 allows for input and output of data with other devices that may be connected to each computer system. For example, I/O interface 1412 may provide a connection to external devices 1418 such as a keyboard, keypad, a touch screen, and/or some other suitable input device. External devices 1418 can also include portable computer readable storage media such as, for example, thumb drives, portable optical or magnetic disks, and memory cards. Software and data used to practice embodiments of the present invention can be stored on such portable computer readable storage media and can be loaded onto persistent storage 1408 via I/O interface(s) 1412. I/O interface(s) 1412 also connects to a display 1420.

Display 1420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

The terminology used herein is for the purpose of describing particular embodiments only and is not intended to be limiting of the present invention. As used herein, the singular forms "a", "an" and "the" are intended to include the plural forms as well, unless the context clearly indicates otherwise.

Each respective figure, in addition to illustrating methods of and functionality of the present invention at various stages, also illustrates the logic of the method as implemented, in whole or in part, by one or more devices and structures. Such devices and structures are configured to (i.e., include one or more components, such as resistors, capacitors, transistors and the like that are connected to enable the performing of a process) implement the method of merging one or more non-transactional stores and one or more thread-specific transactional stores into one or more cache line templates in a store buffer in a store cache. In other words, one or more computer hardware devices can be created that are configured to implement the method and processes described herein with reference to the Figures and their corresponding descriptions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiment, the practical application or technical improvement over technologies found in the marketplace, or to enable others of ordinary skill in the art to understand the embodiments disclosed herein.

Embodiments of the present invention may be used in a variety of electronic applications, including but not limited to advanced sensors, memory/data storage, semiconductors, microprocessors and other applications.

A resulting device and structure, such as an integrated circuit (IC) chip can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may be included by only some of the described embodiments. Accordingly, the invention is not to be seen as limited by the foregoing description. A reference to an element in the singular is not intended to mean "one and only one" unless specifically stated, but rather "one or more." All structural and functional equivalents to the elements of the various embodiments described throughout this disclosure that are known or later come to be known to those of ordinary skill in the art are expressly incorporated herein by reference and intended to be encompassed by the invention. It is therefore to be understood that changes may be made in the particular embodiments disclosed which are within the scope of the present invention as outlined by the appended claims.

What is claimed is:

1. A computer program product for maintaining data integrity in a computer data storage system by backing up and restoring one or more clone file trees in the computer data storage system, the computer program product comprising:
   one or more non-transitory computer readable storage media and program instructions stored in the one or more non-transitory computer readable storage media, the program instructions that are executed by at least one or more computer processors comprising:
program instructions to generate a clone management table that includes at least one clone file parent and at least one clone file child;
program instructions to record, in the clone management table, a clone management information about each clone file in one or more clone file trees in a file system of a computing device, wherein (i) the clone file tree includes metadata specifying a sequence of files with parent-child relationships in which a given clone file child is generated from a given clone file parent that immediately preceded the given clone file child in the sequence (ii) the given clone file parent is modified to be a read-only file when a given clone child file is created and (iii) the given clone file child is a read and write file;
program instructions to, in response to receiving a backup request, update the clone management information and store one or more data blocks that are in one or more clone file trees;
program instructions to, in response to receiving a request to restore a clone file, analyze, the clone management information about the clone file and restore one or more data blocks in the clone file to the file system;
program instructions to, in response to receiving a request to restore a clone file parent, analyze the clone management information about the clone file parent and restore one or more data blocks in the clone file parent to the file system, wherein a given clone parent the contains all data blocks that were originally in a file when a clone of the given clone parent file was created;
program instructions to, in response to receiving a request to restore a clone file tree, (i) analyze the clone management information about the clone file tree and (ii) restore one or more data blocks in the clone file tree to the file system of the computing device; and
program instructions to, in response to receiving a request to check a validity of the clone management table, analyze the clone management information in the clone management table for coherence, and generate a list of an invalid information that is in the clone management table, wherein the updating the clone management information in the clone management table enables the backup and the restoration of at least a part of the clone file tree precludes one or more data redundancies and restores the clone file tree to a form that the clone file tree had when the clone file tree was backed up.

2. The computer program product of claim 1, further comprising program instructions, stored on the one or more non-transitory computer readable storage media, to:
include in a clone management information on a clone file: file information on the clone file, a location of one or more data blocks that have been written in the clone file, and a last backup time of the clone file.

3. The computer program product of claim 2, further comprising program instructions, stored on the one or more non-transitory computer readable storage media, to:
include in the file information: an identifier of the clone file, a size of the clone file, an inode number of the clone file, an inode metadata of the clone file, an inode number of a parent of the clone file, a depth level of the clone file in a clone file tree, a child count of the clone file, and a valid indicator for the clone management information.

4. The computer program product of claim 1, further comprising program instructions, stored on the one or more non-transitory computer readable storage media, to:
backup clone files from the file system using a backup and restore server; and restore clone files to the file system using a backup and restore server.

5. The computer program product of claim 4, wherein the clone management table is located in the backup and restore server.

6. The computer program product of claim 5, wherein the backup and restore server and the clone management table are distributed across a plurality of computers in the file system.

7. A computer system for maintaining data integrity in a computer data storage system by backing up and restoring one or more clone file trees in the computer data storage system, the computer system comprising:
one or more computer processors, one or more computer readable storage media, and program instructions stored in the one or more computer readable storage media for execution by at least one of the one or more computer processors, the program instructions comprising:
program instructions to generate a clone management table that includes at least one clone file parent and at least one clone file child;
program instructions to record, in the clone management table, a clone management information about each clone file in one or more clone file trees in a file system of a computing device, wherein (i) the clone file tree includes metadata specifying a sequence of files with parent-child relationships in which a given clone file child is generated from a clone file parent that immediately preceded the given clone file child in the sequence (ii) the given clone file parent is modified to be a read-only file when a given clone child file is created and (iii) the given clone file child is a read and write file;
program instructions to, in response to receiving a backup request, update the clone management information and store one or more data blocks that are in one or more clone file trees;
program instructions to, in response to receiving a request to restore a clone file, analyze, the clone management information about the clone file and restore one or more data blocks in the clone file to the file system;
program instructions to, in response to receiving a request to restore a clone file parent, analyze the clone management information about the clone file parent and restore one or more data blocks in the clone file parent to the file system, wherein the given clone parent file contains all data blocks that were originally in a file when a clone of the given clone parent file was created;
program instructions to, in response to receiving a request to restore a clone file tree, (i) analyze the clone management information about the clone file tree and (ii) restore one or more data blocks in the clone file tree to the file system of the computing device; and
program instructions to, in response to receiving a request to check a validity of the clone management table, analyzing, by the one or more computer processors, an information in the clone management table for coherence, and generating a list of an invalid information that is in the clone management table, wherein the updating the clone management information in the clone management table enables the backup and the restoration of at least a part of the clone file tree precludes one or more redundancies and restores the clone file tree to a form that the clone file tree had when the clone file tree was backed up.

8. The computer system of claim 7, further comprising program instructions, stored on the one or more computer readable storage media, to:
include in the clone management information on a clone file: file information on the clone file, a location of one or more data blocks that have been written to in the clone file, and a last backup time of the clone file.

9. The computer system of claim 8, further comprising program instructions, stored on the one or more computer readable storage media, to:
include in the file information: an identifier of the clone file, a size of the clone file, an inode number of the clone file, an inode metadata of the clone file, an inode number of a parent of the clone file, a depth level of the clone file in a clone file tree, a child count of the clone file, and a valid indicator for the clone management information.

10. The computer system of claim 7, further comprising program instructions, stored on the one or more computer readable storage media, to:
backup clone files from the file system using a backup and restore server; and restore clone files to the file system using a backup and restore server.

11. The computer system of claim 10, wherein the clone management table is located in the backup and restore server.

* * * * *